US009539954B2

United States Patent
Felkins et al.

(10) Patent No.: US 9,539,954 B2
(45) Date of Patent: Jan. 10, 2017

(54) VEHICLE COMPARTMENT ASSEMBLY

(71) Applicant: Nissan North America, Inc., Franklin, TN (US)

(72) Inventors: Hiromi Felkins, Milford, MI (US); Jessica Buza, Riverview, MI (US); Michael Eberlein, Plymouth, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 14/633,683

(22) Filed: Feb. 27, 2015

(65) Prior Publication Data

US 2016/0250981 A1 Sep. 1, 2016

(51) Int. Cl.
B60R 11/02 (2006.01)
B60R 7/06 (2006.01)
B60R 11/00 (2006.01)

(52) U.S. Cl.
CPC .......... B60R 11/02 (2013.01); B60R 7/06 (2013.01); *B60R 2011/0094* (2013.01)

(58) Field of Classification Search
CPC ..... B60R 11/02; B60R 7/06; B60R 2011/0294
USPC .................. 296/37.8, 24.34, 37.14
See application file for complete search history.

(56) References Cited

U.S. PATENT DOCUMENTS

| 6,473,302 | B1 | 10/2002 | Korycan et al. |
| 7,413,229 | B2 | 8/2008 | Kukucka et al. |
| 8,172,293 | B2 | 5/2012 | Lota et al. |
| 8,517,447 | B2 | 8/2013 | Biggs |
| 8,528,956 | B1 * | 9/2013 | Winiger ............... B60R 7/04 296/24.34 |
| 8,641,120 | B2 | 2/2014 | Zimmerman et al. |
| 2011/0156478 | A1 | 6/2011 | Thorsell et al. |

\* cited by examiner

*Primary Examiner* — Joseph D Pape
(74) *Attorney, Agent, or Firm* — Global IP Counselors, LLP (57) ABSTRACT

A vehicle compartment assembly includes a housing with a first site wall, a second side wall, a first end wall, a second end wall and a bottom wall. The first and second side walls, the first and second end walls and the bottom wall define a storage cavity within the housing. The first side wall includes a first projection extending into the storage cavity. The second side wall includes a second projection extending into the storage cavity toward the first projection. The first projection, the second projection and the first end wall define a device slot within the storage cavity. The device slot is dimensioned such that with a conventional media device disposed within the device slot an upper section of the conventional media device extends above the upper end of the housing and is exposed above the upper end.

17 Claims, 9 Drawing Sheets

VEHICLE COMPARTMENT ASSEMBLY

BACKGROUND

Field of the Invention

The present invention generally relates to a vehicle compartment assembly. More specifically, the present invention relates to a compartment assembly configured to receive a media device in a visible in-use orientation and a hidden stored orientation.

Background Information

Vehicles are currently provided with various means for connecting to media devices such as MP3 players and/or cellular telephones. Such means for connecting to a media device include, for example, any one or more of the various wireless communication systems and/or electronic outlets that provide direct, electronic connection via a cable to the media device. The various wireless communication systems and/or electronic outlets are further connected to, for example, a vehicle audio system in order to playback music or other audio files, and/or provide telephone connectivity. Such means for connecting to a media device are typically concealed somewhere within the vehicle.

SUMMARY

One object of the disclosure is to provide a vehicle compartment assembly with electronic outlets in order to connect directly to a media device.

Another object of the disclosure is to provide a vehicle compartment assembly with a structure that receives the media device such that the media device can be placed in a visible in-use orientation and can be moved to a hidden stored orientation.

In view of the state of the known technology, one aspect of the present disclosure is to provide a vehicle compartment assembly with a housing having a first, side wall, a second side wall, a first end wall, a second end wall and a bottom wall. The second side wall is opposite the first side wall. The first end wall extends from the first side wall to the second side wall. The second end wall is opposite the first end wall. The bottom all extends between the first and second side walls and the first and second end walls. The first and second side walls, the first and second end walls and the bottom wall define a storage cavity within the housing. The housing further has an upper end. The first side wall includes a first projection that extends into the storage cavity. The second side wall includes a second projection that extends into the storage cavity toward the first projection. The first projection, the second projection and the first end wall define a device slot within the storage cavity. The device slot is dimensioned such that with a conventional media device disposed within the device slot, an upper section of the conventional media device extends above the upper end of the housing and is exposed above the upper end. The remainder of the storage cavity is dimensioned such that with the conventional media device disposed within the remainder of the storage cavity all of the conventional media device fits within the remainder of the storage cavity below the upper end of the housing.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
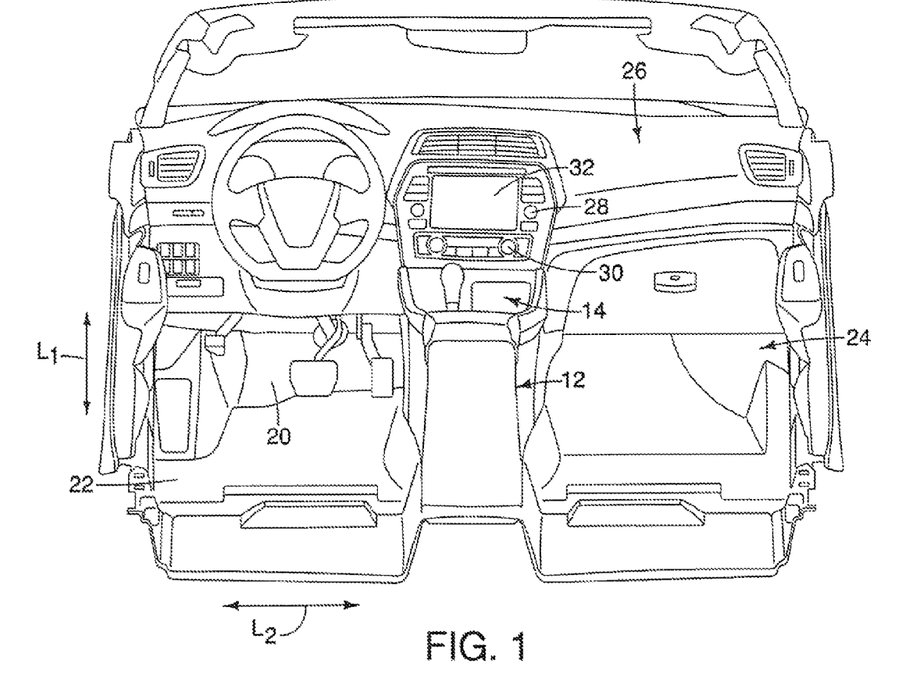
FIG. 1 is a rear view of a passenger compartment of a vehicle showing an instrument panel and a center console with a compartment assembly in accordance with the first embodiment.

Referring initially to FIG. 1, a vehicle 10 that includes a center console 12 equipped with a compartment assembly 14, is illustrated in accordance with a first embodiment. A description of the compartment assembly 14 is provided below following a brief description of the vehicle 10 and the center console 12.

The vehicle 10 includes structure such as a dash wall 20 and a floor 22 that at least partially define a passenger compartment 24. An instrument panel 26 is mounted to the dash wall 20 via fasteners (not shown) in a conventional manner. The instrument panel 26 includes, among other features, an audio system 28, an air conditioning, control panel 30 and a video display 32 used with for example, a global positioning system and/or a backup camera system. The audio system 28, the air conditioning control panel 30 and the video display 32 are all conventional features. Since instrument panels and various associated features are conventional, further description of the instrument panel 26 and its various features is omitted for the sake of brevity.

Figure 2:
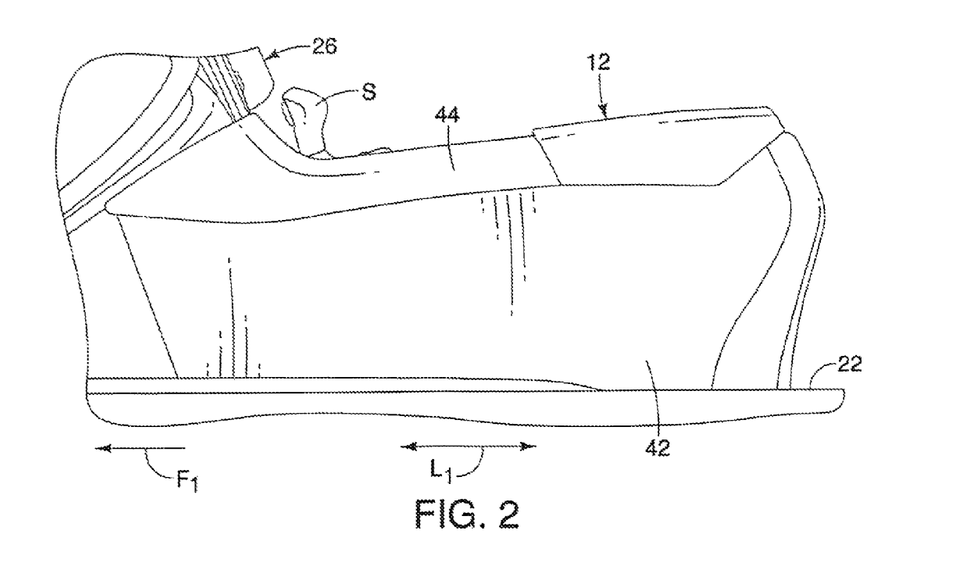
FIG. 2 is a side view of a forward portion of the passenger compartment showing the center console and a portion of the instrument panel in accordance with the first embodiment.
Figure 3:
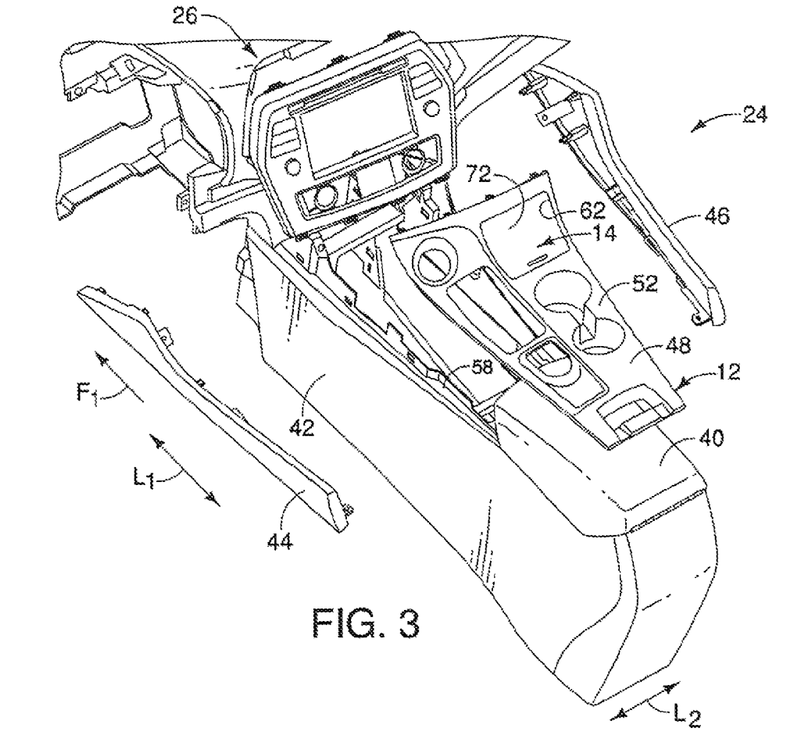
FIG. 3 is an exploded view of the center console and portions of the instrument panel showing an upper panel of the center console in accordance with the first embodiment.

As shown in FIGS. 2 and 3, the center console 12 is attached to the floor 22 in a conventional manner via fasteners (not shown). When installed, the center console 12 extends in a vehicle longitudinal direction $L_1$ between two front seats (not shown), as indicated in FIGS. 1, 2 and 3. As shown in an exploded view in FIG. 3, the center console 12 includes, among other features, a main body 40, driver's side panels 42 and 44, passenger's side panels 46 (only an upper one of the passenger's side panels is visible in FIG. 3) and an upper panel 48. The main body 40 is directly attached to the floor 22. The driver's side panels 42 and 44, the passenger's side panels 46 and the upper panel 48 are all fixedly attached to the main body 40 in a manner described in, for example, U.S. application Ser. No. 14/180,733, filed Feb. 2, 2014, assigned to Nissan North America. U.S. application Ser. No. 14/180,733 is incorporated herein by reference in its entirety.

Figure 4:
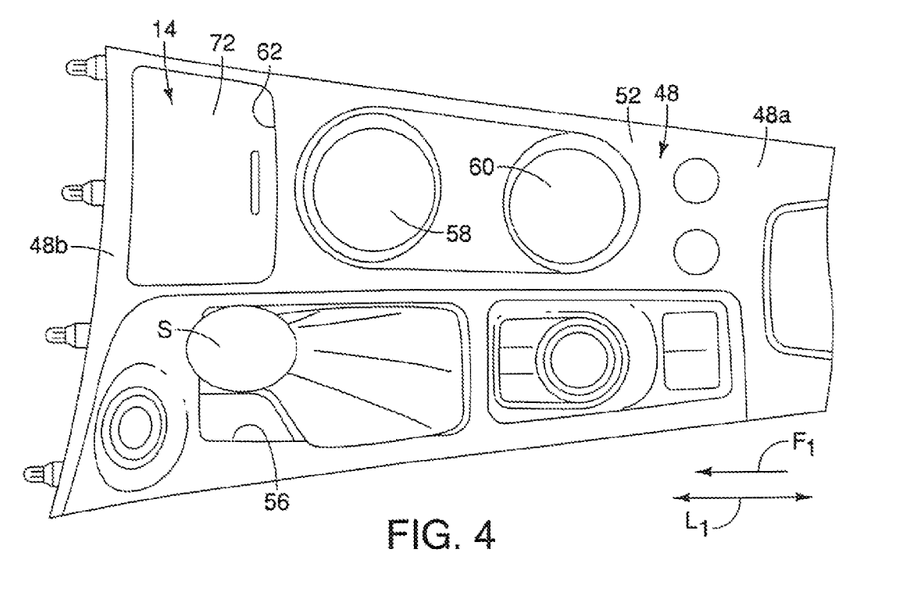
FIG. 4 is a top view of the upper panel shown removed from the center console in accordance with the first embodiment.
Figure 5:
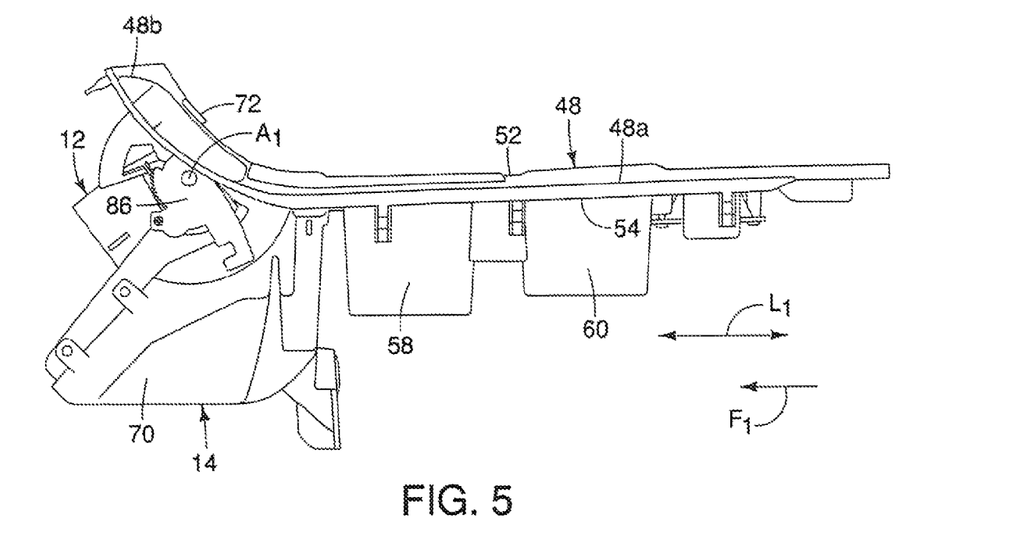
FIG. 5 is a side view of the upper panel showing the compartment assembly attached thereto with a lid of the compartment assembly in a closed orientation in accordance with the first embodiment.
Figure 6:
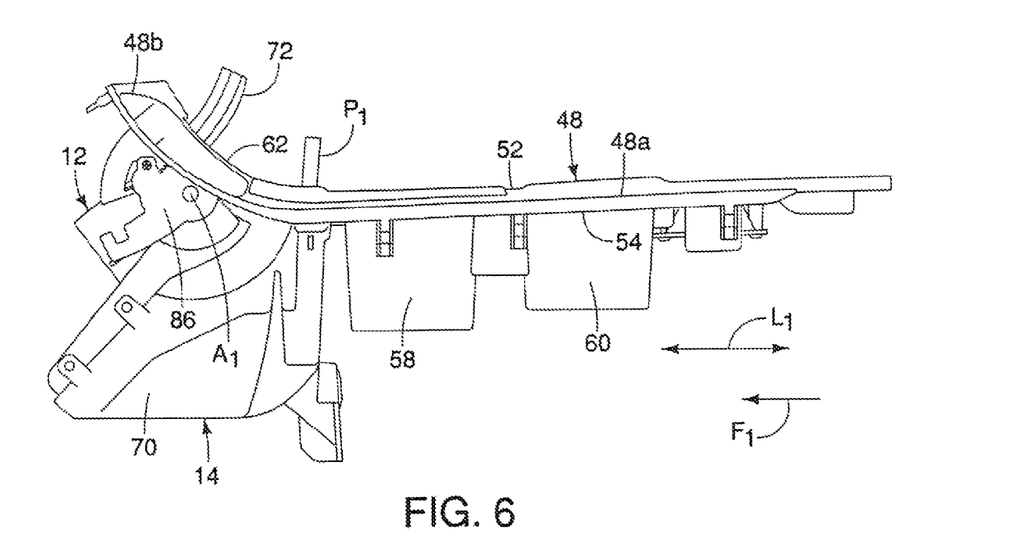
FIG. 6 is another side view of the upper panel similar to FIG. 5, showing the compartment assembly attached thereto with the lid of the compartment assembly in an open orientation with a media device placed within the compartment assembly extending out of the compartment assembly and above an upper surface of the upper panel in accordance with the first embodiment.

The upper panel 48 is shown removed from the center console 12 in FIGS. 4, 5 and 6. The upper panel 48 includes, among other features, a main portion 48a, a front portion 48b, an upper surface 52 and an attachment surface 54. As shown in FIGS. 5 and 6, the compartment assembly 14 is rigidly fastened to the attachment surface 54 by, for example, threaded fasteners (not shown), in a conventional manner. Further, the main portion 48a is generally flat or planar and the front portion 48b curves upward where it attaches to the instrument panel 26. As shown in FIG. 4, the upper surface 52 is a finished surface that is exposed within the passenger compartment 24. The upper surface 52 includes a plurality of features, such as, a shifter receiving opening 56, cup holders 58 and 60 and has an opening 62 that provides access to the compartment assembly 14. The opening 62 is primarily located in the front portion 48b of the upper panel 48. The front portion 48b has a curved contour that extends upward toward the instrument panel 26 in a forward direction $F_1$. A transmission shift lever S extends through the shifter receiver opening 56 in a conventional manner. The compartment assembly 14 is attached to the lower surface 54 of the upper panel 48 via mechanical fasteners (not shown) in a conventional manner, with an upper open end of the compartment assembly 14 aligning with the opening 62.

Figure 7:
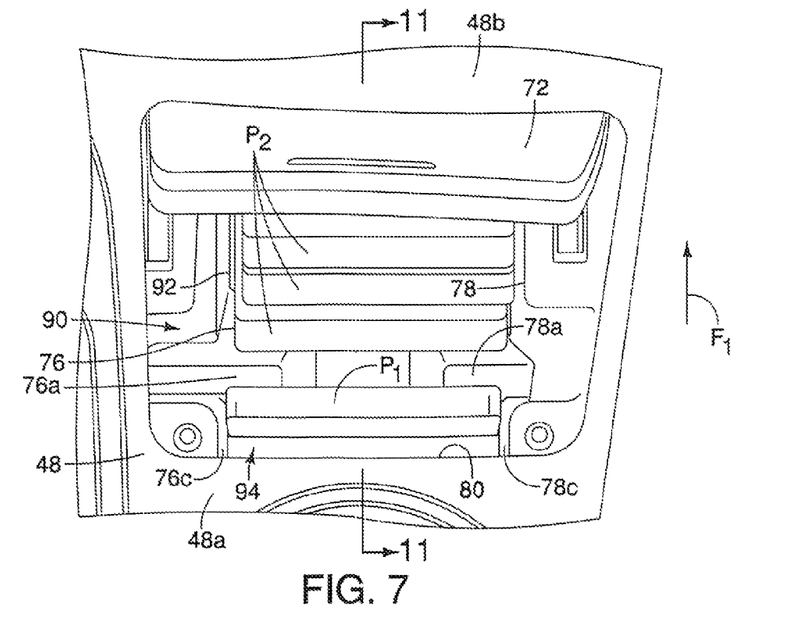
FIG. 7 is a top view of a section of the upper panel and the compartment assembly with the lid in the open orientation showing the media device placed within a device slot within a storage cavity of the compartment assembly and extending out of the compartment assembly in accordance with the first embodiment.
Figure 8:
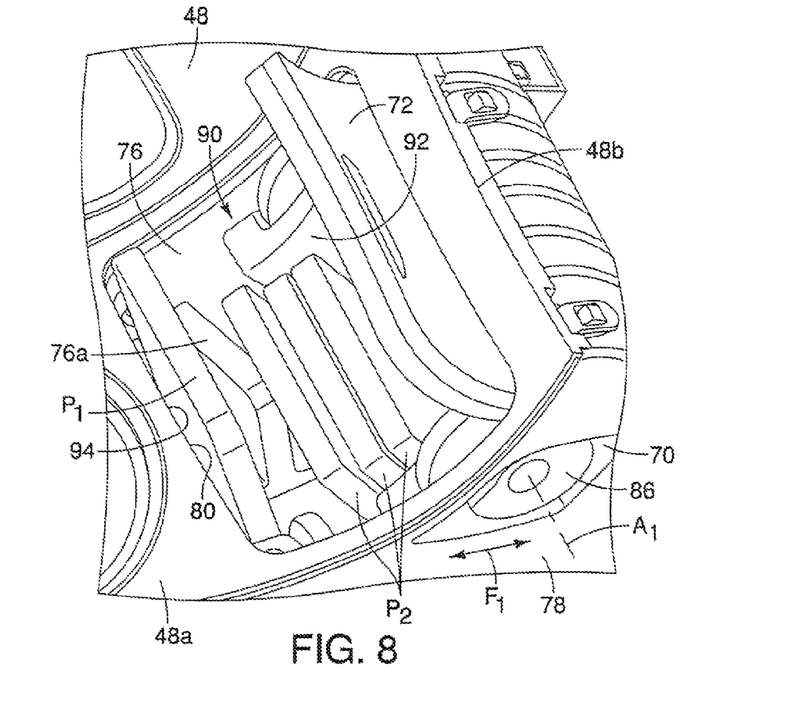
FIG. 8 is a perspective view of the section of the upper panel and the compartment assembly shown in FIG. 7 with the lid in the open orientation showing the media device placed within the device slot of the storage cavity in accordance with the first embodiment.

A description of the compartment assembly 14 is now provided with reference to FIGS. 7-14. The compartment assembly 14 is configured and dimensioned to retain and store one at least one media device $P_1$ in a plurality of differing locations and orientations. For example, as shown in FIGS. 6, 7 and 8, the media device $P_1$ can be positioned in the compartment assembly 14 such that a portion of the media device $P_1$ is exposed and extends above the upper surface 52 of the upper panel 48 of the center console 12. Further, additional media devices $P_2$ can be stored within the compartment 14 such that the additional media devices $P_2$ are located completely within the compartment assembly 14, as shown in FIGS. 7 and 8 and described in greater detail below.

The media devices $P_1$ and $P_2$ can any of a plurality of electronic devices, such as cellular telephones, MP3 player/recorders, and/or other digital audio and video devices. The media devices $P_1$ and $P_2$ are small, hand held devices used by vehicle occupants and are configured to electronically (via cable connections) connect to for example, the audio system 28 and/or the video display 32. Since such media devices are conventional electronic gadgets, further description is omitted for the sake of brevity.

The compartment assembly 14 basically includes a housing 70 and a lid 72. The housing 70 is basically a molded member that includes a first side wall 76, a second side wall 78, a first end wall 80, a second end wall 82 and a bottom wall 84. The housing 70 includes a plurality of fastener parts or flanges that enable attachment to the upper panel 48 via mechanical fasteners (not shown). The lid 72 is supported to the housing 70 by a lid movement mechanism 86. The lid movement mechanism 86 includes pivot shafts that define a pivot axis $A_1$ such that the lid 72 is moveable between a closed orientation (FIGS. 2-5) and an open orientation (FIG. 6-14). In the closed orientation, the lid 72 covers and conceals anything located within the housing 70. In the open orientation, the lid 72 is positioned away from the housing 70, exposing anything, located within the housing 70. The lid movement mechanism 86 is a conventional mechanism that includes a biasing member (not shown) that urges the lid 72 toward the open orientation. In the open orientation, at least a portion of the lid 72 moves into a lid pocket 70a formed in the housing 70. The lid movement mechanism 86 further includes a locking mechanism (not shown) that retains the lid 72 in the closed position such that by pressing down slightly on the lid 72 in the closed orientation, the lid 72 is released and moves to the open orientation via the biasing member (not shown). Moving the lid 72 to the closed orientation causes the locking mechanism (not shown) to lock the lid 72 in the closed orientation. Since loci mechanisms and the lid movement mechanism 86 are conventional, further description is omitted for the sake of brevity.

The first side wall 76 and the second side wall 78 of the housing 70 face each other with at least portions thereof being parallel to one another. The first side wall 76 and the second side wall 78 define opposite lateral sides of the housing 70. With the compartment assembly 14 installed within the vehicle 10, the first and second side walls 76 and 78 extend in the vehicle longitudinal direction $L_1$. Hence, the second side wall 78 is opposite the first side wall 76. The first end wall 80 and the second end wall 82 define rear and front ends, respectively, of the housing 70. The first end wall 80 extends from a rearward edge of the first side wall 76 to a rearward edge of the second side wall 78. The second end wall 82 extends from a forward edge of the first side wall 76 to a forward edge of the second side wall 78.

Figure 11:
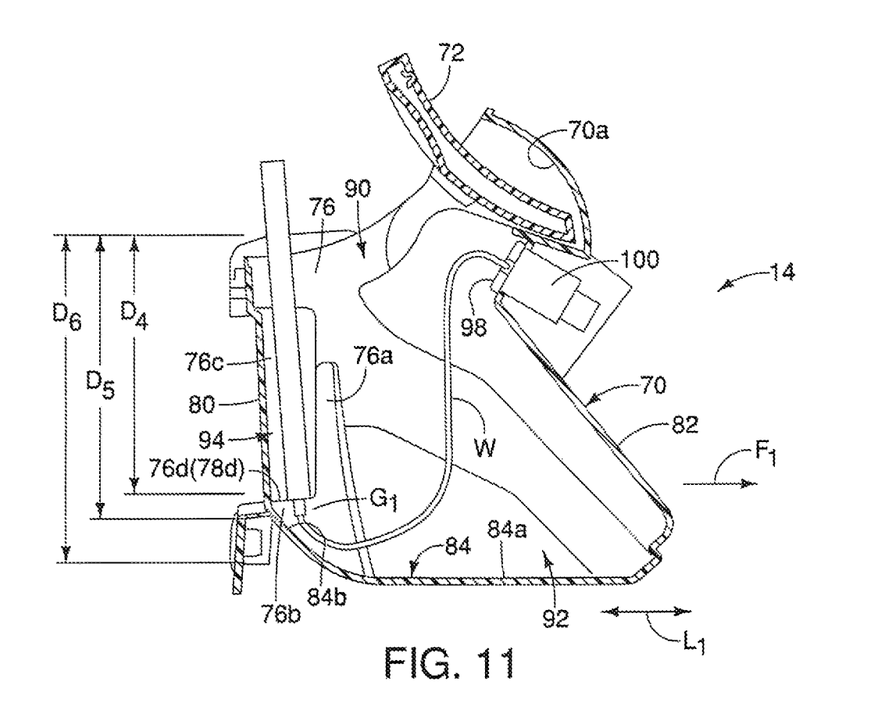
FIG. 11 is a cross-sectional view of the compartment assembly shown removed from the upper panel taken along the line 11-11 in FIG. 7, showing details of the device slot within the storage cavity and the media device in accordance with the first embodiment.
Figure 12:
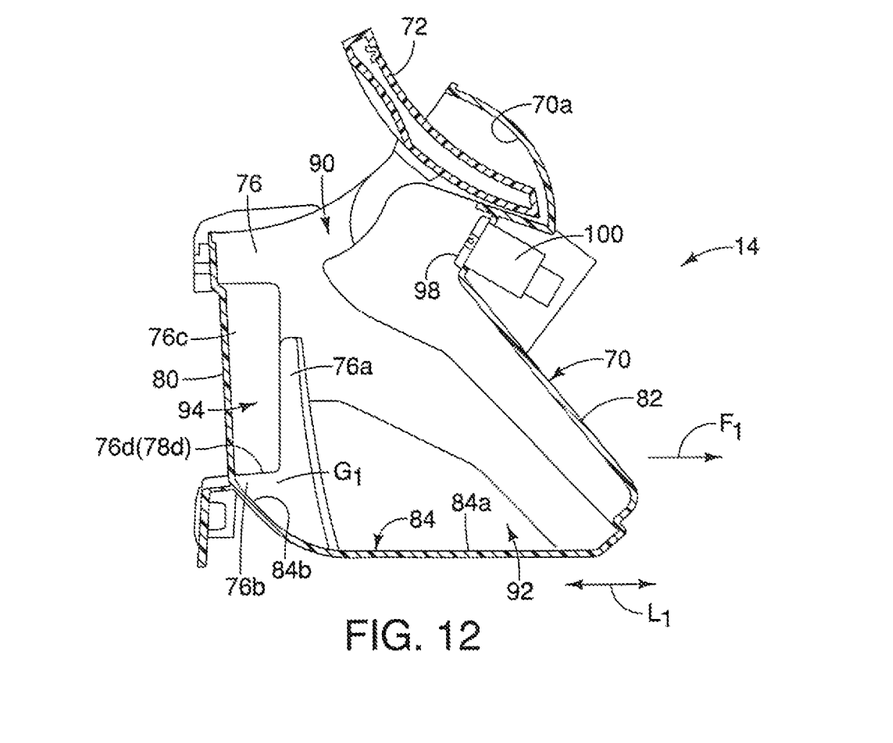
FIG. 12 is another cross-sectional view of the compartment assembly similar to FIG. 11, showing details of the device slot and the storage cavity with the media device removed in accordance with the first embodiment.

Both the first end wall 80 and the second end wall 82 extend in a vehicle lateral direction $L_2$, with the compartment assembly 14 installed within the vehicle 10. However, the first end wall 80 and the second end wall 82 are not parallel to one another in the depicted embodiment. The first end wall 80 is generally upright (vertical). The second end wall 82 is inclined such that an upper end of the second end wall 82 is located rearward of the lower end of the second end wall 82, as is shown in FIGS. 11 and 12, relative to the forward direction $F_1$ of the vehicle 10. Further, the second end wall 82 is at least partially located beneath the instrument panel 26 with the compartment assembly 14 installed within the vehicle 10.

The bottom wall 84 extends from a lower edge of the first side wall 76 to a lower edge of the second side wall 78 and further extends from at lower edge of the first end wall 80 to a lower edge of the second end wall 82.

The first side wall 76, the second side wall 78, the first end will 80, the second end wall 82 and the bottom wall 84 together define a storage cavity 90 within the housing 70. The storage cavity 90 is accessed through the opening 62 in the upper panel 48. The storage cavity 90 is covered and concealed by the lid 72 when the lid 72 is in the closed orientation (FIGS. 2-5). When the lid 72 is in the open orientation (FIGS. 6-14) the storage cavity 90 is exposed and can be accessed by a vehicle occupant.

As shown in FIGS. 11 and 12, the storage cavity 90 is divided into a main storage area 92 and a device slot 94, which are described in greater detail below.

The first side wall 76 and the second side wall 78 are formed with identical features, except that they are mirror images of one another, being on opposite sides of the housing 70. Therefore, description of features of the first side wall 76 below corresponds equally to the second side wall 78. The first side wall 76 is formed with a first projection 76a, a second projection 76b and a third projection 76c. Correspondingly, the second side wall 78 has a first projection 78a, a second projection 78b and a third projection 78c.

Figure 9:
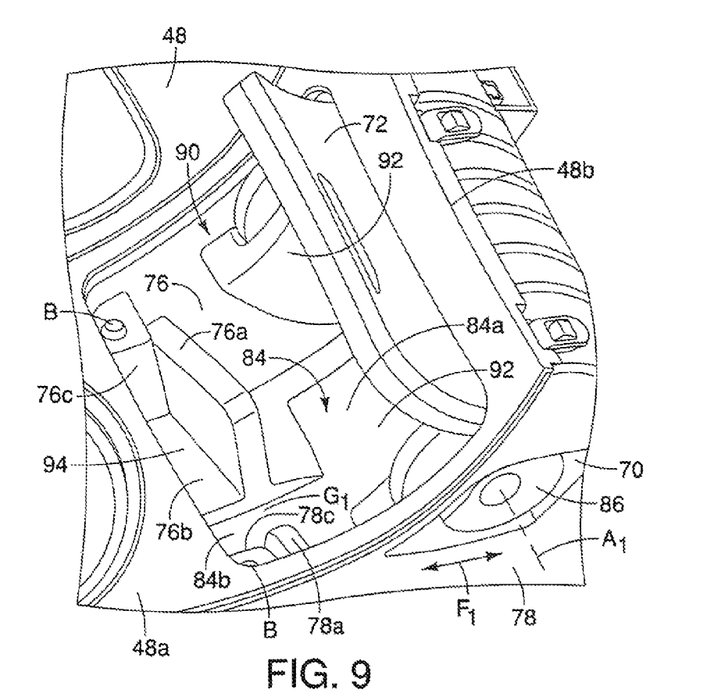
FIG. 9 is another perspective view of the section of the upper panel and the compartment assembly similar to FIG. 8 with the lid in the open orientation and with the media device removed showing details of the device slot and the storage cavity within the compartment assembly in accordance with the first embodiment.
Figure 10:
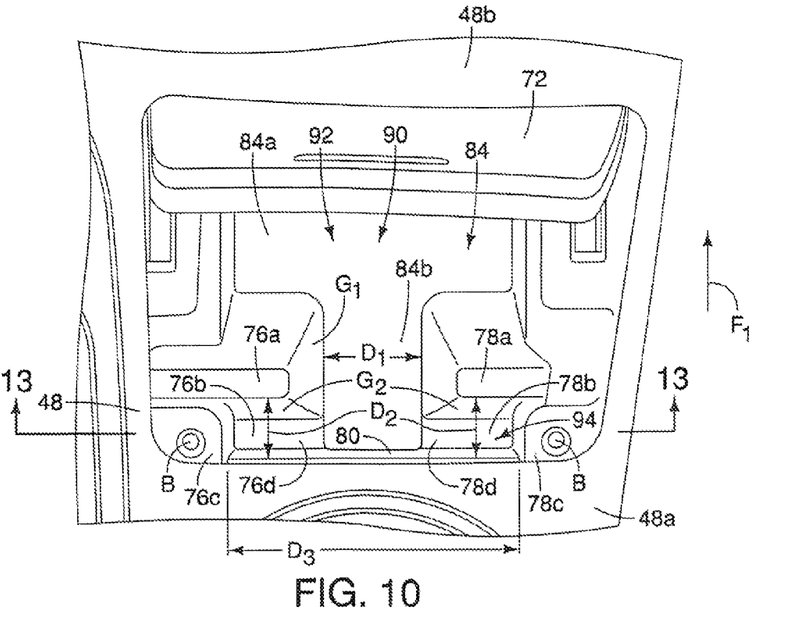
FIG. 10 is another top view of the section of the upper panel and the compartment assembly similar to FIG. 7 with the lid in the open orientation and with the media device removed showing details of the device slot and the storage cavity within the compartment assembly in accordance with the first embodiment.

As shown in FIGS. 9 and 10, the first projection 76a extends from the remainder of the first side wall 76 into the storage cavity 90 in a direction that is approximately parallel to the first end wall 80. Similarly, the first projection 78a extends from the remainder of the second side wall 78 into the storage cavity 90, also approximately parallel to the first end wall 80. Further the first projection 76a and the first projection 78a extend toward one another but do not contact one another. Specifically, as shown in FIG. 10, a first gap $G_1$ is defined between the first projection 76a and the first projection 78a. At a bottom end of each of the first projections 76a and 78a, the gap $G_1$ defines a first distance $D_1$. The first projections 76a and 78a are each spaced apart from the first end wall 80 by a second distance $D_2$, defining a second gap $G_2$.

The device slot 94 is defined between the first end wall 80 and the first and second projections 76a and 78a. A lower boundary (bottom) of the device slot 94 is defined by upper surfaces 76d and 78d of the second projections 76b and 78b (lower slot surfaces). The device slot 94 has a dimension in the vehicle longitudinal direction $L_1$ that corresponds and is equal to the second distance $D_2$ defined by the second gap $G_2$. The distance $D_2$ is sufficiently large to accommodate and receive any of a variety of media devices, such as the media device $P_1$, as shown in FIGS. 7 and 8.

The second projection 76b is located adjacent to a bottom of the first end wall 80 between the first end wall 80 and the first projection 76a. Similarly, the second projection 78b is located adjacent to the bottom of the first end wall 80 between the first end wall 80 and the first projection 78a. The second projections 76b and 78b define a bottom of the device slot 94. In a manner similar to the first projections 76a and 78a, the second projection 76b is spaced apart from the second projection 78b.

The third projection 76c and the third projection 78c extend inward toward one another within the device slot 94 and are spaced apart from one another by a third distance $D_3$. The third distance $D_3$ defines an overall width of the device slot 94. The third distance $D_3$ is greater than the first distance $D_1$ and is greater than a width of the media device $P_1$. The first distance $D_1$ is less than a width of the media device $P_1$. The third distance $D_3$ defines the overall width of the device slot 94. An upper surface of each of the third projections 76c and 78c includes an elastic bumper B that contacts the lid 72 when the lid 72 is in the closed orientation.

The bottom wall 84 has two sections, a forward section 84a and a rearward section 84b. The forward section 84a is basically flat or planar and extends rearward from the bottom of the second end wall 82, as shown in FIGS. 11 and 12. The rearward section 84b has a curved contour that extends upward from the forward section 84a to the bottom of the first end wall 80 and toward the second projections 76b and 78b.

The forward section 84a extends the full width of the housing 70 between the first side wall 76 and the second side wall 78. The rearward section 84b is narrowed and extends from the bottom of the first end wall 80, curving downward in the forward direction $F_1$ between the first and second projections 76a and 76b the first and second projections 78a and 78b. Further, the rearward section 84b has an overall width that is equal to the second distance $D_2$ (the distance between the first projection 76a and the first projection 78a). As shown in FIGS. 11 and 12, the rearward section 84b of the bottom wall 84 is located below the second projections 76b and 78b.

Consequently, the first gap $G_1$ defined between the second projections 76b and 78b extends below the second projections 76b and 78b and below the upper surfaces 76d and 78d of the second projections 76b and 78b. Specifically, the upper surfaces 76d and 78d of the second projections 76b and 78b are located a fourth distance $D_4$ below the upper edge of the housing 70 (proximate the upper surface 52 of the upper panel 48). Immediately below the device slot 94, the curving surface of the rearward section 84b is located a fifth distance $D_5$ below the upper edge of the housing 70 (proximate the upper surface 52 of the upper panel 48). The filth distance $D_5$ is greater than the fourth distance $D_4$. Further, the forward section 84a of the bottom wall 84 is located a sixth distance $D_6$ below the upper edge of the housing. The sixth distance $D_6$ is greater than the fourth distance $D_4$ and the fifth distance $D_5$.

The first gap $G_1$ serves as a cable receiving area as shown in FIG. 11, and described in greater detail below.

Figure 13:
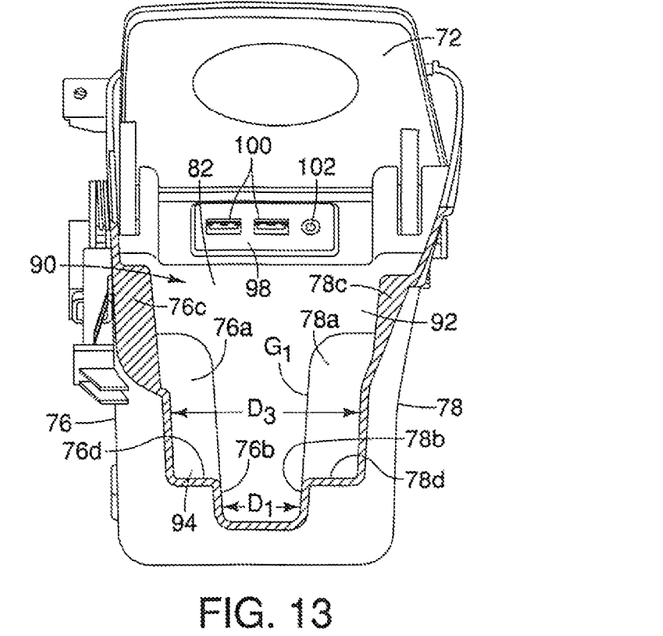
FIG. 13 is a cross-sectional view of the compartment assembly shown removed from the upper panel taken along the line 13-13 in FIG. 10, showing details of the device slot within the storage cavity in accordance with the first embodiment.
Figure 14:
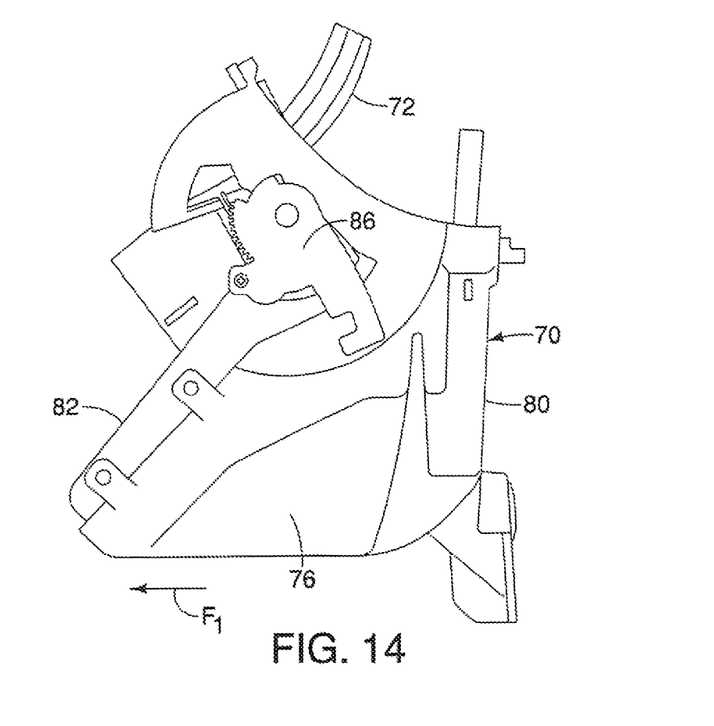
FIG. 14 is a side view of the compartment assembly showing a lid movement mechanism in accordance with the first embodiment.

As shown in FIG. 11-13 of the depicted embodiment, the second end wall 82 includes an outlet panel 98 provided with a plurality of ports. The exact number of the ports can vary vehicle to vehicle. However, in the depicted embodiment, there are three ports. Specifically, the outlet panel 98 is provided with two USB ports 100 and an audio input port 102. The USB ports 100 and the audio input port 102 are both connected to, for example, the audio system 28 and/or the video display 32, and are further connected to a power source within the vehicle, such as a battery (not shown) in order to serve as a recharging station. For example, if the media device $P_1$ is an audio storage device, such as an MP3 player/recorder, the media device $P_1$ can be connected to one of the USB ports 100 via a corresponding wiring harness W, as shown in FIG. 11. Music or audio files an then be played using the audio system 28 of the vehicle 10. If the media device $P_1$ is a cellular telephone, the media device $P_1$ can connect to, for example, the audio system 28 and/or the video display 32 to provide conventional hands-free operation.

As shown in FIG. 11, when the media device $P_1$ is placed in the device slot 94, a cable W can be connected to a port (not shown) at the bottom of the media device $P_1$. The first gap $G_1$ is dimensioned so that the cable W can extend downward below the device slot 94. The cable W can further be connected to one of the USB ports 100 or the audio input port 102. Since the rearward section 84a curves downward and away from the surfaces 76d and 78d, there is sufficient space tot the cable W to extend downward from the media device $P_1$ with little to no interference or obstructions. Hence, the first gap $G_1$ serves as a cable receiving area or recess below the device slot 94, as shown in FIG. 11.

The storage area 92 has larger overall dimensions as compared to the device slot 94. Specifically, the storage area 92 of the storage cavity 90 is dimensioned to retain and store a plurality of media devices $P_2$, and can also store the media device $P_1$ when the media device $P_1$ is removed from the device slot 94. When the media devices $P_1$ and $P_2$ are stowed in the storage area 92 of the storage cavity 90, the storage area 92 is dimensioned such that the lid 72 can move to the closed orientation, covering and concealing the media devices $P_1$ and $P_2$. However, depending on the dimensions of the media device $P_1$, when the media device $P_1$ is placed in the media slot 94, the media device $P_1$ extends upward above the upper surface 52 of the upper panel 48. Therefore, the lid 72 cannot be closed with the media device $P_1$ is positioned in the media slot 94. However, it is possible for a vehicle occupant to observe information displayed on the screen of the media device $P_1$ when it is placed in the media slot 94. For example, several conventional smartphone devices show brief alerts at the very top of the screen, which can remain visible to the vehicle occupant. On the other hand, it is possible for the lid 72 to be closed with the media device $P_1$ positioned in the media slot 94 when the media device $P_1$ extends no higher than the upper ends of the first projections 76a and 78a.

Second Embodiment

Referring now to FIGS. 15-19, a compartment assembly 14 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

Figure 15:
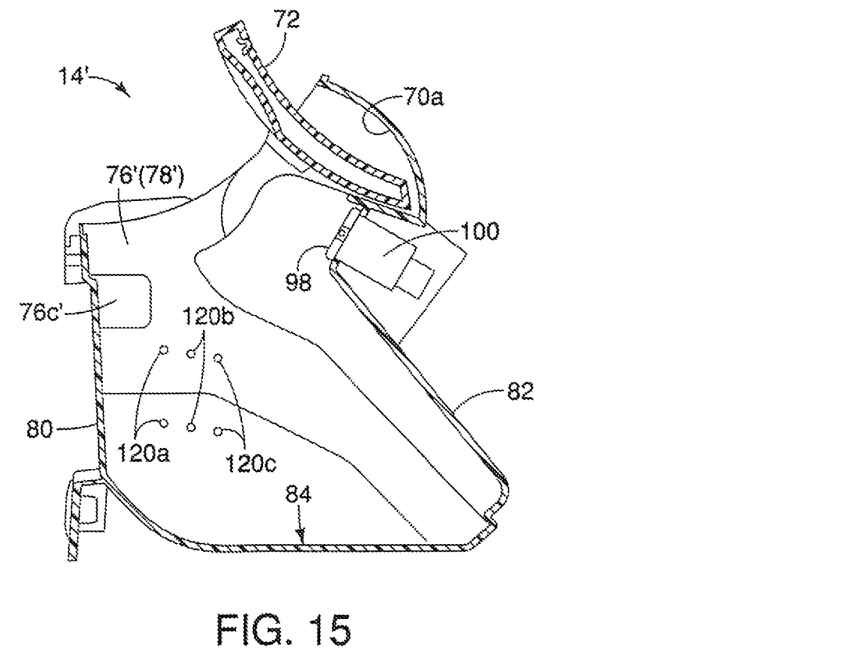
FIG. 15 is a cross-sectional view of a compartment assembly showing three pairs of apertures configured to receive re-positionable device slot rails, the pairs of apertures corresponding to three slot defining positions in accordance with a second embodiment.

The compartment assembly 14' includes a housing 70' that is similar to the housing 70 of the first embodiment. The housing 70' includes side walls 76' and 78' (only side wall 76' is shown). The side wall 78' is identical to the side wall 76', but is a mirror image to the side wall 76'. The side wall 76' (and side wall 78') is generally the same as the first and second side walls 76 and 78 of the first embodiment, except that the side wall 76' does not include the projections 76a and 76b, and the side wall 78' does not include the projections 78a and 78b. However, the side wall 76' includes a projection 76c' that serves the same purposes as the third projection 76c of the first embodiment. The side walls 76' and 78' each include a plurality of pairs of apertures: first apertures 120a, second apertures 12b and third apertures 120c, described in greater detail below.

The housing 70' also includes first end wall 80, the second end wall 82 and bottom wall 84, as described above with respect to the first embodiment.

Figure 16:
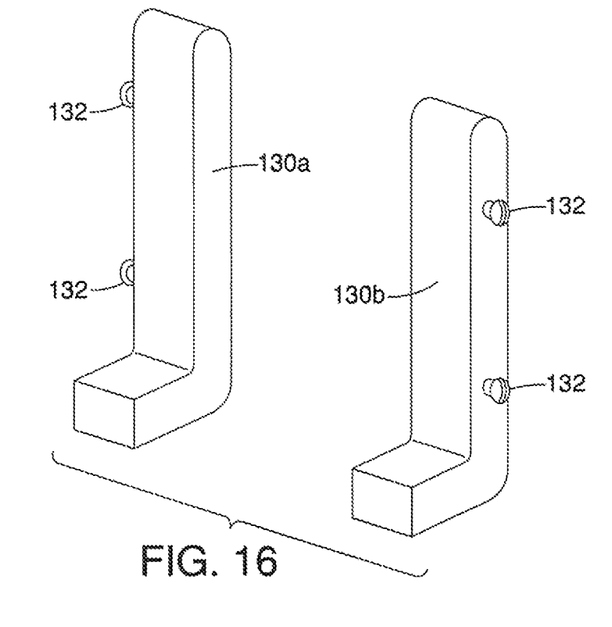
FIG. 16 is a perspective view of a pair of re-positionable device slot rails shown removed from the compartment assembly in accordance with the second embodiment.
Figure 17:
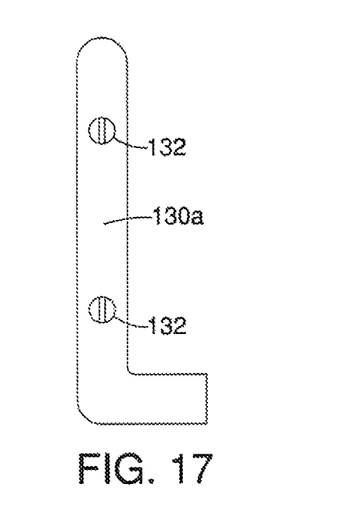
FIG. 17 is an end view of one of the re-positionable device slot rails shown removed from the compartment assembly in accordance with the second embodiment.

In the second embodiment, the housing 70' further includes removable projections 130a and 130b. The projection 130a is configured to attach to the side wall 76' and the projection 130b is configured to attach to side wall 78'. The projections 130a and 130b are dimensioned and configured to removably attach to the side walls 76' and 78'. The projections 130a and 130b are generally identical, but are mirror images of one another. Therefore, description of one applies equally to both.

The projection 130a (and 130b) includes snap-fitting elements 132 formed unitarily therewith. The snap-fitting elements 132 project outward from the projection 130a and are spaced apart by a distance corresponding to the distance between the first apertures 120a. The second apertures 120b and third apertures 120c are similarly spaced apart from one another. The snap-fitting elements 132 can be forced into any pair of the first apertures 120a, the second apertures 120b or the third apertures 120c.

Figure 18:
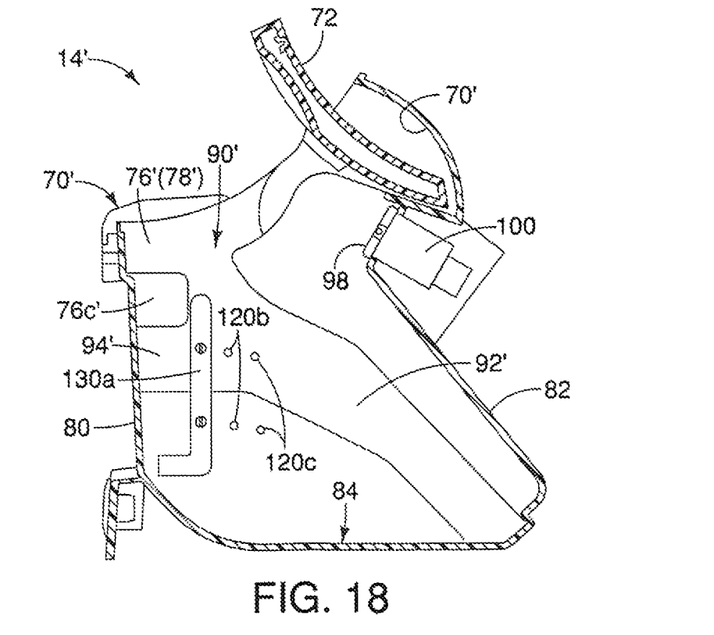
FIG. 18 is another cross-sectional view of the compartment assembly shown in FIG. 15 showing one of the re-positionable device slot rails installed to a first pair of the three pairs of apertures defining a first device slot within the compartment assembly in accordance with the second embodiment.
Figure 19:
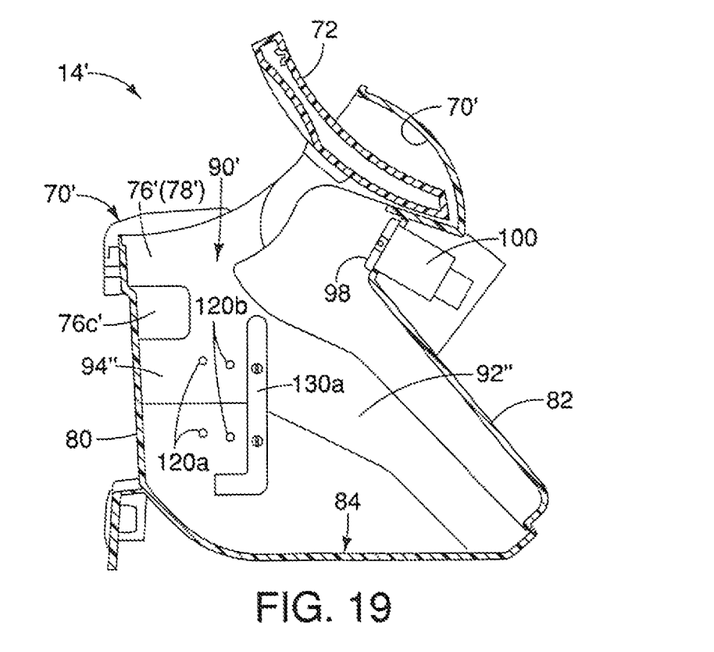
FIG. 19 is another cross-sectional view of the compartment assembly shown in FIG. 15 showing the one of the re-positionable device slot rails installed to a third pair of the three pairs of apertures defining another device slot within the compartment assembly in accordance with the second embodiment.

FIG. 15 shows the first apertures 120a, the second apertures 120b and the third apertures 120c with the projections 130a and 130b removed. FIG. 18 shows the projection 130a installed to the first apertures 120a (the projection 130b similarly installs to the side wall 78'). Hence, the projections 130a and 130b define a device slot 94' having a first overall dimension. When the projections 130a and 130b are moved to either of the second apertures 120b or the third apertures 120c, the dimensions of the device slot 94' are changed. For example, as shown in FIG. 19, a differently sized device slot 94" is defined within the housing 70'.

Consequently, in the second embodiment, the device slot 94' can be re-sized depending upon the specific media device used with the vehicle 10.

The vehicle 10 includes many features and structures that are conventional components that are well known in the art. Since these features and structures are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including" "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle compartment assembly. Accordingly, these terms, as utilized to describe the present invention should be interpreted relative to a vehicle equipped with the vehicle compartment assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in as particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle compartment assembly comprising:
   a housing having a first side wall, a second side wall opposite the first side wall, a first end wall extending from the first side wall to the second side wall, a second end wall opposite the first end wall and a bottom wall extending between the first and second side walls and the first and second end walls, the first and second side walls, the first and second end walls and the bottom wall defining a storage cavity within the housing, the housing having an upper end,
   the first side wall including a first projection extending into the storage cavity, the second side wall including a second projection extending into the storage cavity toward the first projection, the first projection, the second projection and the first end wall defining a device slot within the storage cavity, the first projection and the second projection are aligned with one another and are spaced apart from the first end wall by a first distance and spaced apart from the second end wall by a second distance greater than the first distance,
   the device slot being dimensioned such that with a conventional media device disposed within the device slot an upper section of the conventional media device extends above the upper end of the housing and is exposed above the upper end, and
   the remainder of the storage cavity being dimensioned such that with the conventional media device disposed within the remainder of the storage cavity all of the conventional media device fits within the remainder of the storage cavity below the upper end of the housing.

2. The vehicle compartment assembly according to claim 1, further comprising
   a lid and hinge mechanism, the lid being supported to the housing by the hinge mechanism for movement between an open orientation and a closed orientation, such that in the open orientation the storage cavity is exposed and in the closed orientation the lid covers the storage cavity.

3. The vehicle compartment assembly according to claim 1, wherein
   the bottom wall has a curved contour and extends below the lower surface of the device slot.

4. The vehicle compartment assembly according to claim 3, wherein
   the first projection and the second projection further define lower slot surfaces that are shaped and contoured to restrict downward movement of the conventional device stored in device slot.

5. The vehicle compartment assembly according to claim 4, wherein
   the bottom wall forms a gap between the first and second projections below the lower slot surfaces defining a cable receiving area below the device slot.

6. The vehicle compartment assembly according to claim 1, wherein
   the bottom wall includes at least a first portion and a second portion, the first portion extending from the first end wall toward lower ends of the first and second projections, the first portion of the bottom wall defining a lower end of the device slot, the second portion defining a lower end of a remainder of the storage cavity, the first portion being a third distance away from the upper end of the housing and the second portion being a fourth distance away from the upper end of the housing, the fourth distance being greater than the third distance.

7. The vehicle compartment assembly according to claim 6, wherein
   the first portion of the bottom wall is spaced apart from the lower ends of the first and second projections.

8. The vehicle compartment assembly according to claim 7, wherein
   the first projection and the second projection are spaced apart from one another defining a cable receiving area therebetween.

9. The vehicle compartment assembly according to claim 1, wherein
the second end wall includes at least one electronic connector plug (USB port).

10. The vehicle compartment assembly according to claim 9, wherein
the at least one electronic connector plug (USB port) is located adjacent to an upper end of the second end wall.

11. The vehicle compartment assembly according to claim 9, wherein
the second end wall includes a lid pocket formed adjacent an upper end of the second end wall, with the at least one electronic connector plug (USB port) being located within the storage cavity adjacent to the lid pocket.

12. The vehicle compartment assembly according to claim 11, further comprising
a lid and hinge mechanism, the lid being supported to the housing by the hinge mechanism for movement between an open orientation and a closed orientation, such that in the open orientation the storage cavity is exposed and in the closed orientation the lid covers the storage cavity.

13. The vehicle compartment assembly according to claim 12, wherein
the lid at least partially extends into the lid pocket with the lid in the open orientation and the lid covers the lid pocket with the lid in the closed orientation.

14. The vehicle compartment assembly according to claim 1, further comprising:
a center console main body having an upper surface with a transmission shifter receiving section and a housing receiving section with the housing being installed within the housing receiving section.

15. The vehicle compartment assembly according to claim 14, further comprising:
an instrument panel control cluster attached to a forward end of the center console main body with the housing receiving section and the housing being located at a lower end of the instrument panel control cluster.

16. A vehicle compartment assembly comprising:
a housing having a first side wall, a second side wall opposite the first side wall, a first end wall extending from the first side wall to the second side wall, a second end wall opposite the first end wall and a bottom wall extending between the first and second side walls and the first and second end walls, the first and second side walls, the first and second end walls and the bottom wall defining a storage cavity within the housing, the housing having an upper end,
the first side wall including a first projection extending into the storage cavity, the second side wall including a second projection extending into the storage cavity toward the first projection, the first projection, the second projection and the first end wall defining a device slot within the storage cavity, the first projection and the second projection being co-planar, a first gap being defined between the bottom wall and respective lower ends of the first and second projections defining a cable receiving area below the device slot, the first projection and the second projection being spaced apart from one another defining a second gap therebetween open to the first gap and the device slot,
the device slot being dimensioned such that with a conventional media device disposed within the device slot an upper section of the conventional media device extends above the upper end of the housing and is exposed above the upper end, and
the remainder of the storage cavity being dimensioned such that with the conventional media device disposed within the remainder of the storage cavity all of the conventional media device fits within the remainder of the storage cavity below the upper end of the housing.

17. A vehicle compartment assembly comprising:
a housing having a first side wall, a second side wall opposite the first side wall, a first end wall extending from the first side wall to the second side wall, a second end wall opposite the first end wall and a bottom wall extending between the first and second side walls and the first and second end walls, the first and second side walls, the first and second end walls and the bottom wall defining a storage cavity within the housing, the housing having an upper end,
the first side wall including a first projection extending into the storage cavity with a first lower slot surface extending from a lower portion of the first projection to the first end wall, the second side wall including a second projection extending into the storage cavity toward the first projection and including a second lower slot surface extending from a lower portion of the second projection to the first end wall, the first and second lower slot surfaces being co-planar, the first projection, the second projection, the first lower slot surface, the second lower slot surface and the first end wall defining a device slot within the storage cavity, the first slot surface and the second slot surface being spaced apart from one another forming a gap therebetween that defines a cable receiving area that extends below the device slot and is open to the storage cavity,
the device slot being dimensioned such that with a conventional media device disposed within the device slot an upper section of the conventional media device extends above the upper end of the housing and is exposed above the upper end, and
the remainder of the storage cavity being dimensioned such that with the conventional media device disposed within the remainder of the storage cavity all of the conventional media device fits within the remainder of the storage cavity below the upper end of the housing.

* * * * *